April 18, 1944.  A. J. MATTER  2,347,118
SEALING UNIT
Filed Oct. 27, 1942  2 Sheets-Sheet 1
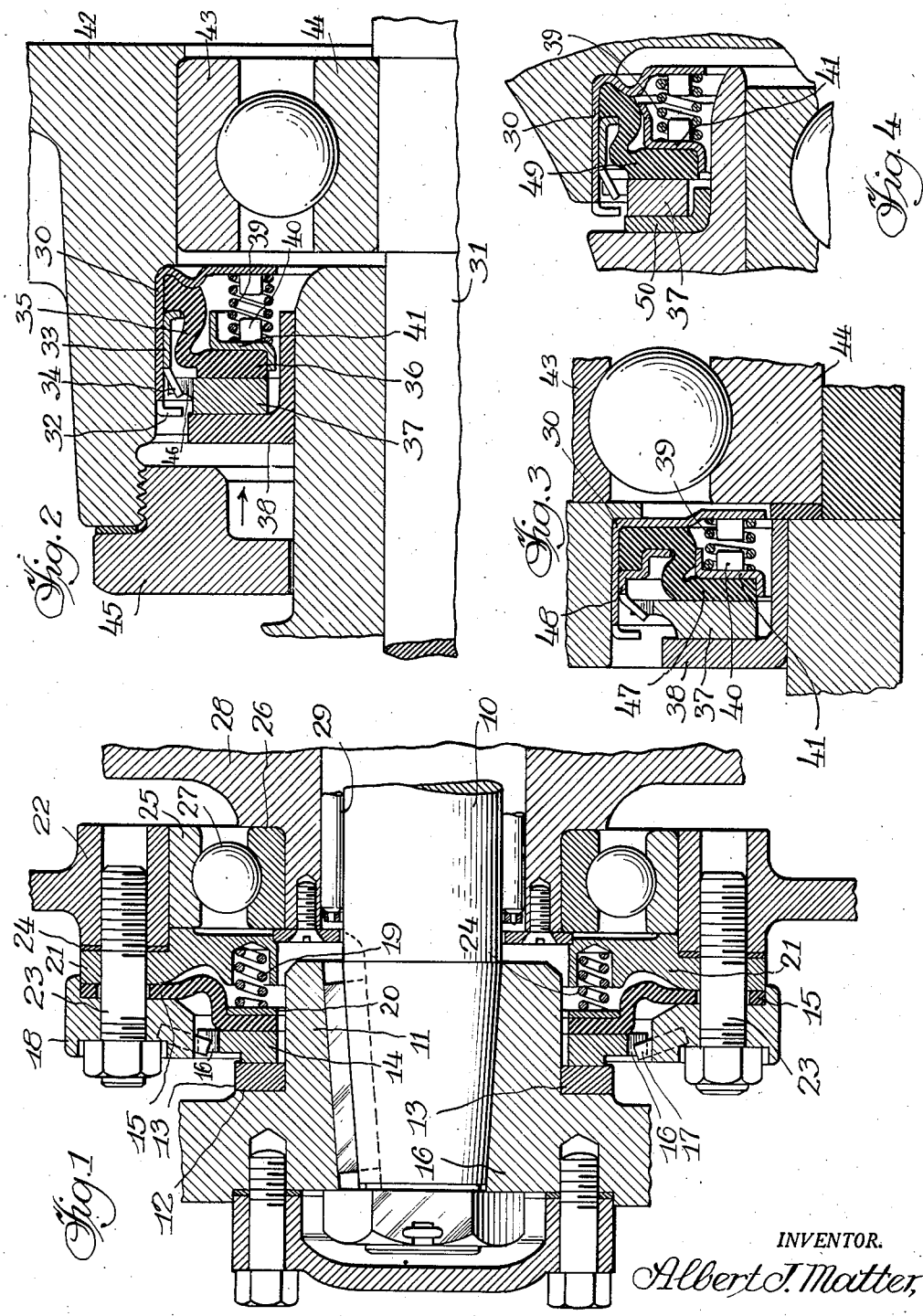
INVENTOR.
Albert J. Matter April 18, 1944. A. J. MATTER 2,347,118
SEALING UNIT
Filed Oct. 27, 1942 2 Sheets-Sheet 2
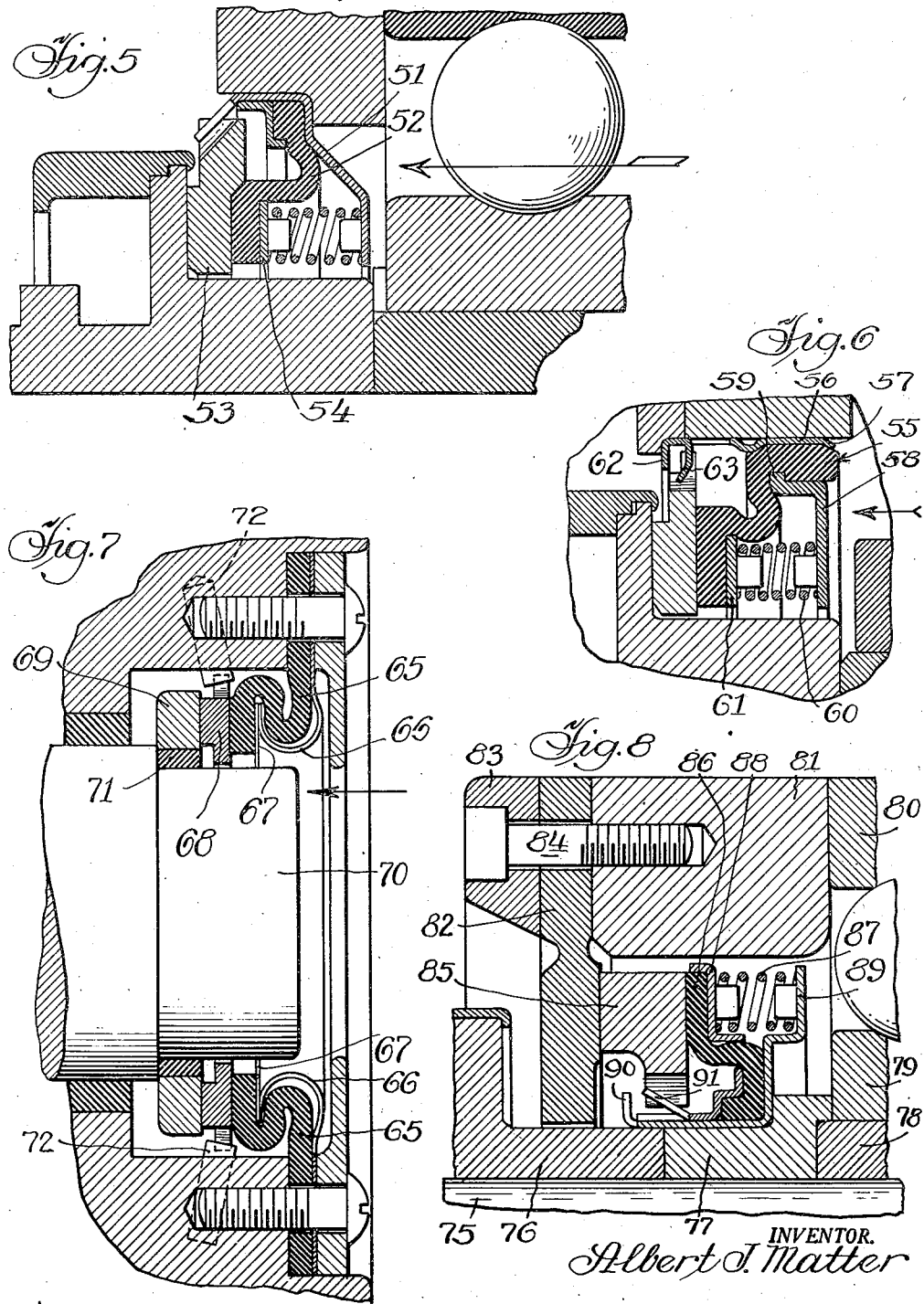
INVENTOR.
Albert J. Matter Patented Apr. 18, 1944

2,347,118

UNITED STATES PATENT OFFICE 2,347,118

SEALING UNIT

Albert J. Matter, Park Ridge, Ill., assignor to Crane Packing Company, Chicago, Ill., a corporation of Illinois Application October 27, 1942, Serial No. 463,483

2 Claims. (Cl. 286—11)

My invention relates to improvements in sealing units and more particularly to a self-contained seal for preventing leakage of oil, water and other liquids, as used for example in a bearing assembly. It is well adapted for use where the liquid is under considerable pressure, although it is suitable also for moderate pressures.

Many sealing devices have been developed heretofore for preventing leakage along the rotating shaft of a pump by direct engagement of the sealing member with said shaft. Other seals have been proposed for sealing leakage near the end of a rotating shaft, by means of two rings under yielding pressure, one of which is stationary and the other of which rotates with the shaft and has a surface perpendicular to the axis of said shaft in engagement with the adjacent stationary surface. Seals of this latter type have not been sufficiently effective for many purposes, as for example where substantial pressures are employed. Furthermore, they wear away and permit leakage and in some cases they are not sufficiently flexible to meet the demands made upon them. Also, careful adjustment has been necessitated in the case of many such installations.

The general object of the invention is to provide an effective, durable seal in the form of a self-contained unit which may be readily applied as a bearing seal.

A contributory object is to provide a relatively small, compact seal in which a flexible sealing member is used which permits irregularities in the movement of the rotating shaft, without breaking the seal.

A further object is to provide an improved self-contained unit to seal the annular space around a shaft against leakage, and in which the sealing member is out of contact with said shaft.

Another object is to provide a sealing washer of suitable, anti-friction material, having a smooth surface capable of being pressed into intimate engagement with a flat surface perpendicular to the longitudinal axis of the shaft, pressure being maintained without overheating by means of a flexible, compressible member of rubber-like composition.

Another object is to provide a sealing assembly which includes springs to supplement the pressure exerted by the rubber-like member and seal against leakage of liquids under considerable pressure.

An additional object is to provide a holder for said flexible and compressible member and associated parts having means to prevent deformation of said member beyond predetermined limits.

A further object is to provide a container for various parts of the sealing device which insures a unitary structure and facilitates handling and installation of the same and in which a portion of the compressible member is gripped or anchored in position.

Other objects and advantages will be evident from a consideration of the description which follows.

In the accompanying drawings I have illustrated several embodiments of the invention.

Fig. 1 is a section through a vehicle bearing showing one form of the invention;

Figs. 2, 3 and 4 are modifications in which the sealing parts are contained in a removable casing;

Fig. 5 is a further modification in which the pressure of the liquid is applied from the opposite side of the unit;

Fig. 6 is a further modification;

Fig. 7 is a modified form in which a container is not provided; and

Fig. 8 is a modified form in which the position of some of the rotatable and stationary parts is reversed.

Fig. 1 shows a bearing seal for a vehicle such, for example, as a tractor of special design, the complete details of which tractor are not pertinent to the present invention. The mechanism includes a rotatable shaft 10 which has a hub 11 keyed to it, provided with a shoulder 12 against which is seated a hardened ring or washer 13 which may be made of steel or other suitable material and which has a pressed fit thereon and rotates with the hub. Said ring has an exposed surface in a plane at right angles to the axis of said shaft, said surface being preferably honed.

A non-rotatably mounted sealing washer 14 is pressed against the smooth surface of said ring 13 by means of a flexible sealing member 15 which may consist of molded rubber, neoprene or other compressible or readily deformable material. Said sealing washer 14 is made of any suitable anti-friction material, as for example graphite, bronze, carbon, Bakelite or the like. It has peripheral notches 16 therein which receive radially arranged pins 17 projecting from a clamping ring 18. Said pins, of which there may be two or more, serve to prevent rotation of said sealing washer 14 when the steel ring 13 against which it is pressed, is rotating.

The flexible sealing member 15 has an outer margin, or flange clamped in place by said ring 18 and has an inner flange which is offset somewhat from the plane of said outer flange and which presses against the sealing washer 14. The intervening portion of said sealing member is flexed or is deformed and may have various different curvatures, of which the one shown is an illustration. The pressure exerted against the sealing washer 14 is augmented by a plurality of helical springs 19 which bear against a metal reinforcing ring 20 positioned against the rear side of the inner flange of said flexible sealing member. The other ends of said springs are seated in suitable circumferentially located recesses in an annular wall 21, as shown. In this particular embodiment of the invention there are twelve such recesses, each containing a helical spring, although the number may be varied. Also, the pressure exerted on the sealing washer may be assumed to be fifteen pounds although much higher pressures may be maintained.

The ring 18, annular wall 21 and outer margin of said flexible sealing member 15 are clamped together and to a part 22 by means of studs 23, an intervening oil-tight gasket 24 being provided also. Outer and inner ball bearing raceways 25, 26 and a series of balls 27 are mounted in a central opening in said part 22. The inner raceway is secured to a member 28 which surrounds the shaft 10, with roller bearings 29 interposed between the two.

The flexibility of the sealing member makes it possible to maintain an effective seal despite slight irregularities in the rotation of the shaft and its associated parts. The hard, smooth sliding surfaces of the two rings 13, 14, one fast and one rotating, are in a plane at right angles to the axis of the shaft and are capable of withstanding long use without substantial wear and without generating excessive heat. The oil under pressure within the annular chamber in which the sealing member is located, cannot escape past said sealing surfaces, whether parts are stationary or whether one is rotating with respect to the other. The walls of said annular chamber in which the flexible member may bend back and forth slightly, serve to a certain extent to reinforce the same and limit the deformation of said member under high pressures. For example, the annular groove in the wall 21 immediately behind the bend in the flexible member, provides a curved surface conforming generally to the curvature of the intermediate portion of said flexible member and provides a stop beyond which said member cannot be forced.

In Fig. 2 the sealing members are contained within a housing 30 which may be of sheet metal of generally cup-shaped form having an opening in the bottom through which the shaft 31 extends. Said container has a plurality of bent over lugs or ears 32 to serve as stops and confine the parts hereinafter mentioned. Within said cup-shaped container is a ring 33 having a pressed fit and having a flange at one end spaced from the bottom of said container providing an undercut recess, as shown. At the other end of said ring are a plurality of inclined lugs 34.

The sealing member 35 is molded of rubber or neoprene and comprises preferably enlarged marginal flanges with a thinner connecting web to increase the flexibility thereof. This permits a certain yielding movement on the longitudinal axis somewhat after the manner of a bellows. The outer annular portion of said flexible member is confined within the undercut channel and is thus locked in place. The other margin comprising a flange 36, is comparable in width to the sealing washer 37 against which it presses. Said washer may be made of anti-friction material as in the case previously described and it is pressed against the rotatable member 38 which, in this instance, is a steel ring of angle iron cross section having a pressed fit on the shaft so as to turn therewith. Said anti-friction washer 37 has an annular flange with a number of peripheral notches therein which receive the inclined lugs 34 and which prevent rotation of said washer. Thus there is no slipping between the rear surface of the washer 37 and the adjacent rubber surface of the flange 36. The pressure exerted by the latter is augmented by a plurality of helical springs 39. These springs, at one end, are positioned by metal bosses, struck up from the base of the cup-shaped member 30. At the other end they fit over corresponding lugs 40 struck from a ring 41 of Z-shaped cross section.

The outer flange serves to prevent undue deformation of the flexible web which connects the enlarged inner and outer portions of said flexible sealing member. The inner flange prevents inward deformation of the portion 36 of said flexible sealing member. It will be seen that the sealing members are removable as a unit, being mounted in the casing 30 and hence being self-contained. The unit as a whole has a pressed fit in the annular recess in which it is mounted. Said recess is formed in the casting 42, which carries also the ball bearing raceways 43 and 44. The other end of said opening is closed by a screw threaded apertured plug 45.

In the particular embodiment of the invention shown herein, the sealing washer flange 46 has four radial slots to receive the holding lugs 34. Also, the device is equipped with twelve springs to increase the pressure. Obviously the number in either case may be varied, as desired. When assembling the device the driving lugs 34 are staggered with respect to the retaining lugs 32, to prevent rotation. The pressure of the confined liquid is exerted from the left toward the right in this figure, as indicated by the arrow.

The sealing member shown in Fig. 3 is similar in many respects to the one just described and the reference characters have been used to indicate corresponding parts. The compressible and flexible sealing member 47, however, is of different configuration and the inner ring 48 which confines it is also of different configuration. The outer annular portion of said compressible member, however, is confined in an undercut recess and deformation of said compressible and flexible member is limited by the Z-shaped ring, similar to the one previously described.

In Fig. 4 the flexible, compressible sealing member 49 is similar to the one shown in Fig. 2 but the rotating member 50 and some of the associated structural parts are somewhat different, as will be evident. The seal between the rotating ring 50 and the fixed ring 37 is maintained in the same manner as previously described.

In Fig. 5 the casing 51 for the unit is of somewhat different configuration, as is also the flexible, compressible sealing member 52 confined within the same. The inner flange of said member is confined between the sealing washer 53 and the metal ring 54. In other respects said sealing member is similar to the forms previously described. This seal is designed for use in equipment in which the shaft rotates at 2400 R. P. M. and the oil is used under temperature conditions which vary from 15° to 350° at 40 pounds per square inch pressure. The pressure on the sealing washer is about fifteen pounds and the pressure of the oil is exerted from right to left, as shown by the arrow.

In Fig. 6 the compressible sealing member 55 is of different configuration and is confined within the metal casing 56 which has an inwardly turned flange 57 at the bottom. Said compressible member is retained also by the metal plate 58 having an outwardly turned flange 59 seated in an annular recess to hold said member against movement. The helical springs 60 seat at one end against said plate 58 and at the other end against a ring 61. The retaining and driving ears 62, 63 are also of different configuration than those previously described.

In Fig. 7 the flexible sealing member 65 is doubled back and forth on itself and one of the folds is loosely embraced by a plurality of spring fingers 66 which bear against a metal washer 67 and increase the pressure against the sealing washer 68. The hardened steel ring 69 against which said washer bears is supported on the shaft 70 with a cushioning ring 71 between the two. Said ring is made preferably of synthetic rubber and is compressed firmly by said ring. The pins 72 which prevent rotation of said sealing washer are positioned so as to clear the convolutions or folds in the bellows-like sealing member. Among other uses for which a seal of this character is adapted may be mentioned a megneto driving shaft which may rotate 2600 R. P. M. With this arrangement also a pressure of fifteen pounds may be exerted against the sealing washer but the pressure may have any one of a number of different values, depending on the size and type of materials used.

In Fig. 8 the relative arrangement of the rotating and stationary parts may be said to be reversed. The shaft 75, together with the rings 76, 77 and 78 thereon, may be nonrotatable. The inner raceway 79 is also fixed in position whereas the outer raceway 80 rotates together with the ring 81 the accurately formed steel ring 82 and the securing ring 83, the parts being held together by studs 84. The sealing washer 85 is pressed against the smooth annular surface on the ring 82 by means of the flexible, deformable sealing member 86, and the springs 87, which are confined between the sheet metal member 88 of Z-shaped cross section and the wall of the housing 89. Said housing has retaining lugs 90 and ears 91 formed near the inner walls of the part instead of in the outer walls as in the earlier forms of devices. The pressure is exerted in the direction of the arrow, although it may also be exerted in the opposite direction, in which case it augments the pressure of the springs in increasing the sealing engagement between the relatively stationary and rotatable sealing surfaces.

Although in the various figures some of the parts are described as rotatable and others as stationary, it will be understood that the relative arrangement may be reversed, as the desired seal is maintained between the sealing washer and the ring against which it is pressed, regardless of which one rotates.

It will be noted that the sealing washers are cut away to the rear of their exposed sealing surfaces, thus providing a flange, as for example 46 in Fig. 2, so that the bent-over retaining ears need not project beyond the plane of the sealing surfaces. Before the unit is installed, the springs press the sealing washer outwardly the maximum amount, causing the sealing face of the sealing washer to project substantially beyond the confines of said casing and being restrained by said ears which serve as stops. When the device is installed, the helical springs are compressed further and said flange is out of contact with its stops. The notches which receive the ears or lugs for preventing relative rotation of said sealing washer with respect to said casing, are formed preferably in said flange, as shown in several of the figures of the drawings.

An important feature of the seals described herein is that they are provided with vertical sealing faces, i. e. faces in the plane at right angles to the axis of the shaft and also the sealing member is flexible and compressible. This type of seal, having a non-frictional sealing washer, will operate with less friction and run much cooler than seals previously designed and will take care of many misalignments and vibrations such as are characteristic of most rotating shafts. The reduction in friction results in a decrease in heating. With prior devices where the sealing member is of neoprene or rubber, or some other special composition in direct engagement with the periphery of a shaft, considerable heat is developed, even though the parts are immersed in a bath of oil. As the heat continues, the sealing member swells and expands and in particular when the equipment operates in liquids having temperatures up to 250° to 300° F. said sealing member burns out and fails completely, besides damaging the surface of the shafts on which they seal. The seal of the present invention, while it employs a flexible and compressible member of neoprene or the like which will swell somewhat in hot oil and become somewhat distorted, will not deform to the extent of affecting the results, as it clings through its flange to the sealing washer and by virtue of its flexibility it compensates for wear. A lapped face on the sealing washer, whether it is made of bronze, Bakelite or carbon, gives a perfect seal regardless of vibrations. Also, the use of liquids under fairly high pressures, i. e. 40–75 pounds or more, merely causes the carbon washer to press tightly against its seal and lap itself in, reducing friction and heat to a minimum. Even if the two engaging surfaces run dry very little if any injury results to the flexible neoprene member.

I claim:

1. A bearing seal unit comprising, a cup-shaped container having a central opening to clear a shaft, a cylindrical member secured within said container and having its inner end formed as a flange spaced from the bottom of said container, an anti-friction ring in the open end of said container held in non-rotatable relation with respect thereto, said ring having an accurately formed face at right angles to the longitudinal axis of said container, a compressible sealing member having an outer circumferential flange gripped between said annular flange and the bottom of said container and having an inner circumferential flange in a plane displaced axially from the plane of said outer flange and bearing against the inner face of said ring, said seal being normally under compression axially to tend to press said ring outwardly, a backing ring between which and said first mentioned ring a part of said compressible member is confined, said backing ring having a cylindrical flange to prevent inward deformation of an intermediate part of said compressible member, and helical springs between said backing ring and the bottom of said container.

2. A bearing seal unit comprising, a cup-shaped container having a central opening to clear a shaft, a cylindrical member secured within said container and having its inner end formed as a flange spaced from the bottom of said container, an anti-friction ring in the open end of said container held in non-rotatable relation with respect thereto, said ring having an accurately formed face at right angles to the longitudinal axis of said container, a compressible sealing member having an outer circumferential flange gripped between said annular flange and the bottom of said container and having an inner circumferential flange in a plane displaced axially from the plane of said outer flange with an intermediate thin web to facilitate flexing, said inner flange bearing against the inner face of said ring, said seal being normally under compression axially to tend to press said ring outwardly, a backing ring of Z-shaped cross section behind said compressible member to limit the deformation thereof and having a circular series of bosses thereon, and helical springs fitting over said bosses and confined between said bearing ring and the bottom of said container.

ALBERT J. MATTER.